G. D. NUTTING.
SPECTACLES.
APPLICATION FILED JAN. 11, 1915.

1,223,097.

Patented Apr. 17, 1917.

WITNESSES:

INVENTOR
George D. Nutting

BY

ATTORNEYS

UNITED STATES PATENT OFFICE.

GEORGE D. NUTTING, OF CLEVELAND, OHIO.

SPECTACLES.

1,223,097.

Specification of Letters Patent.

Patented Apr. 17, 1917.

Application filed January 11, 1915. Serial No. 1,506.

*To all whom it may concern:*

Be it known that I, GEORGE D. NUTTING, a citizen of the United States, residing at Cleveland, in the county of Cuyahoga and State of Ohio, have invented certain new and useful Improvements in Spectacles, of which the following is a specification.

This invention relates to an improvement in spectacles, and the invention consists in spectacles or eye glasses having a plurality of sets of lenses so arranged that one or more sets can be used at the same time according to the distance or the nearness of the object to be observed or other requirements of the sight.

Figure 1:
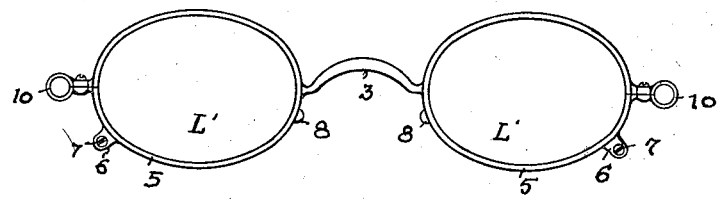
Figure 2:
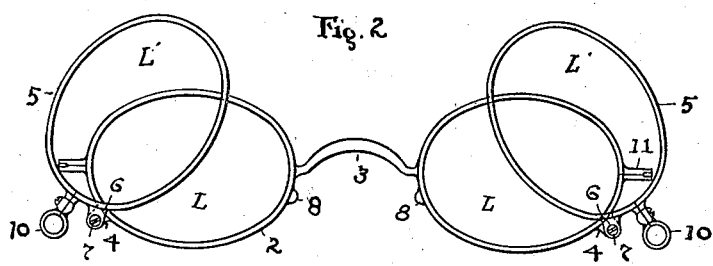
Figure 3:
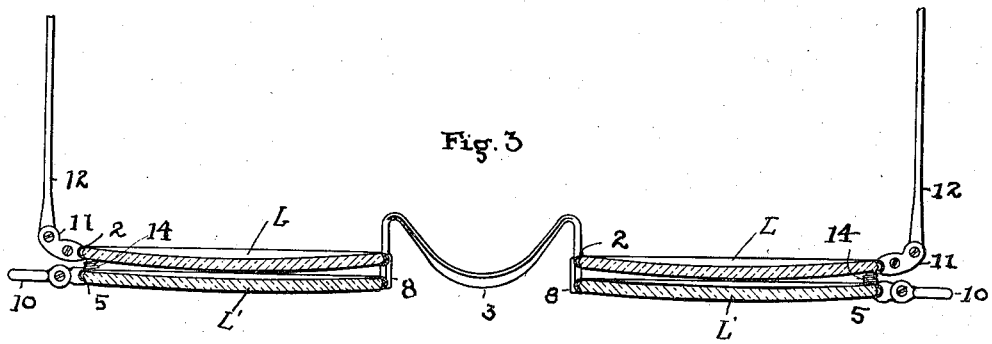

In the accompanying drawings, Figure 1 is a front elevation of the glasses with the two sets in focal lines or one directly in front of the other. Fig. 2 is a front elevation of the glasses with the front or pivoted set partially raised or out of use. Fig. 3 is an enlarged sectional view in plan on a line through the middle of the lens from side to side.

Figure 4:
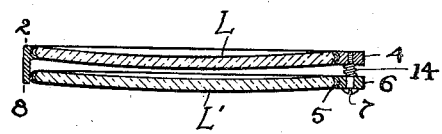

Fig. 4 is a cross section of two of the lenses through the pivot of the outer lens and across the stop or rest therefor on the rim of the inner lens.

In a sense this invention represents an improvement on the so-called bi-focal lens, which, at the least, is a very expensive article and one which people in ordinary financial circumstances can scarcely afford to use. The alternative of this is two interchangeable sets of glasses, but these are inconvenient for most persons and it is also expensive and troublesome to carry two sets, especially, where changes from one to the other are necessarily frequent.

Take shop or factory work, for example. A machinist may require glasses for ordinary wear, but for the fine work of a shop, where light frequently is inadequate, he requires what may be regarded as magnifying glasses or lenses and in fact cannot do his work without them.

In such cases and many others a pair of spectacles or glasses which do not need to be removed or exchanged and yet are good alike for all kinds of work one may have to do, and for far and near sight, are most desirable. To these ends I have made the invention shown herein and which comprises the spectacles having the usual rims 2, bridge 3 and bows 12. The lenses in this frame are indicated by L.

Now, having, say a pair of common spectacles, I supplement the same by a set of lenses L' adapted to be used therewith for close or fine work and so arranged that they are at instant command and all without removal of the spectacles. To this end I provide the said lenses L' with separate rims 5 having adjacent ears 4 and 6 on their outer lower portion next beneath the finger grip 10 on rim 5, and pivotally connect the two rims by a pivot pin or screw 7. A small spiral spring 14 is placed on said pivot pin between the two lenses to provide sufficient friction and tension between them to hold the outer supplemental lens in raised position when not in use and to prevent rattling or displacement when lowered. Fig. 2 shows said lenses thrown up and back but not to their limit and held frictionally by spring 14. Figs. 3 and 4 show said lenses down in using position, as also seen in Fig. 1. The separate finger grips 10 on the rims 5 for lenses L' provide for the individual control thereof and are in clamping relation with the said rims. The rims 2 have lugs 8 at their inner portions which project forward sufficiently to serve as rests for stops for the lenses L'.

In use the spectacles are put on as usual and the supplemental lenses may be down or up, as preferred. If down, they are ready for long distance, and if the outer lenses 5 are raised to look through lenses 2, alone, as in Fig. 2, the glasses are ready for close or fine work, like reading. If the glasses 5 are not to be used for some time, as when one is out in the light, they can be removed and laid aside by simply disconnecting the pivot screw 7. Thus a set of extra glasses is inexpensively provided because the individual lenses are of standard make and kept in stock with the usual optical supplies or furnishings, as also are the frames to receive them.

I might apply the additional lenses to eye glasses which have no bows but have not found that this is really desirable, and they are intended chiefly for indoor work where the glasses usually worn by the person are not strong enough for work that cannot be satisfactorily seen without further aid to the vision. If a double set of supplemental glasses were used the additional or second set would come on the pivots 7 like the first. In other words, two independently pivoted lenses might be mounted in front of each lense L. It is of especial value also that the lenses L' are pivotally mounted at the front of the spectacle frame and in front of the bows, whereby a change in position of either one or both lenses L' may be effected without removing the glasses from the nose and without interference or obstruction by the main spectacle frame and its bows. Moreover, the finger grips 10 are located directly in front of and in line with the clamps or pivot lugs 11 for the bows so that the latter are practically concealed when the front lenses are in lowered rest position, see Fig. 1. However, finger grips 10 project laterally to a greater degree than lugs 11 to afford an unobstructed finger hold and unhampered operation and to avoid accidental down pressure on the lugs and displacement of the main spectacle frame from its seated position on the nose when the finger grip 10 is engaged and the front lens L' raised.

What I claim is:

As a new article of manufacture, a pair of eye glasses having rims and each rim provided with a downwardly projecting lug in the plane of the rim on its outer lower portion, in combination with separate supplemental lenses having rims and lugs thereon matching the lugs on the first named rims and finger grips at their middle outer portion relatively above and outward from said lugs, friction springs between said lugs and pivot screws engaged through said lugs and springs, whereby the outer lenses can be raised more or less and held at any desired elevation by said springs.

In testimony whereof I affix my signature in presence of two witnesses.

GEORGE D. NUTTING.

Witnesses:
R. B. MOSER,
F. M. PAINTER.